United States Patent [19]

Kage

[11] Patent Number: 4,790,013
[45] Date of Patent: Dec. 6, 1988

[54] RECEIVER CAPABLE OF QUICKLY ESTABLISHING STABLE FRAME SYNCHRONIZATION

[75] Inventor: Kouzou Kage, Tokyo, Japan

[73] Assignee: NEC Corporation, Tokyo, Japan

[21] Appl. No.: 720,934

[22] Filed: Apr. 8, 1985

[30] Foreign Application Priority Data

Apr. 6, 1984 [JP] Japan ................................. 59-67348

[51] Int. Cl.$^4$ ........................... H04J 3/06; H04K 1/00
[52] U.S. Cl. .......................................... 380/48; 380/9; 380/49; 375/110; 375/114; 375/118; 375/116
[58] Field of Search ........................ 178/22.17, 22.19; 375/2.1, 2.2, 108, 116, 110, 95, 96, 114, 115; 370/108, 100; 364/728; 380/48, 49, 50, 9

[56] References Cited

U.S. PATENT DOCUMENTS

| | | | |
|---|---|---|---|
| 3,652,799 | 3/1972 | Thomas | 370/106 |
| 3,670,151 | 6/1972 | Lindsay et al. | 364/728 |
| 3,701,894 | 10/1972 | Low et al. | 364/728 |
| 3,792,245 | 2/1974 | Hocker et al. | 364/728 |
| 3,798,378 | 3/1974 | Epstein | 375/116 |
| 3,883,729 | 5/1975 | de Cremicers | 364/728 |
| 4,091,423 | 5/1978 | Branscome | 178/22.17 |
| 4,214,124 | 7/1980 | Jarus | 375/114 |
| 4,305,152 | 12/1981 | Asakawa et al. | 375/2.1 |
| 4,379,206 | 4/1983 | Aoki | 178/22.17 |
| 4,538,281 | 8/1985 | Rajan | 375/2.2 |

Primary Examiner—Salvatore Cangialosi
Attorney, Agent, or Firm—Sughrue, Mion, Zinn, Macpeak & Seas

[57] ABSTRACT

In a receiver responsive to an input signal comprising information signals following frame synchronization signals, respectively, frame synchronization is established by a frame synchronization pulse generator (56) with reference to both of the information signals and the frame synchronization signals. A discriminator (57) discriminates between the information signals and other spurious signals by monitoring descrambled digital signals produced by a descrambler (47) in response to the information signals or by monitoring reproduced analog signals into which the descrambled digital signals are converted by a digital to analog converter (51). The monitoring is carried out within silent parts interposed between information parts of either the descrambled digital signals or the reproduced analog signals. The information signals are discriminated either by a preselected pattern inevitably appearing in the silent parts of the descrambled digital signals or by amplitudes of the silent parts of the reproduced analog signals. Alternatively, the information signals may be discriminated by detecting the autocorrelation of the reproduced analog signals.

9 Claims, 7 Drawing Sheets 4,790,013

RECEIVER CAPABLE OF QUICKLY ESTABLISHING STABLE FRAME SYNCHRONIZATION

BACKGROUND OF THE INVENTION

This invention relates to a receiver capable of reproducing information signals with frame synchronization established.

As will later be described with reference to one figure of the accompanying drawing, a conventional receiver of the type described is supplied with an input signal comprising information signals and frame synchronization signals preceding the information signals, respectively. The information signals carry, for example, an audio signal in a digital form and are usually subjected to scrambling in a transmitter so as to avoid consecutive production of "0" or "1."

The receiver establishes frame synchronization with reference to the frame synchronization signals and carries out descrambling of the information signals to produce a reproduction of the information signals. Anyway, establishment of the frame synchronization resorts only to the frame synchronization signals.

As a rule, a plurality of frames are required in the receiver in order to establish frame synchronization from an asynchronous state. In other words, no reproduction is carried out in the receiver during the above-mentioned plurality of frames and results in interruption of the reproduction. In addition, the receiver is put into the asynchronous state when the frame synchronization signals are not detected due to variation of an error rate in a transmission path.

On the other hand, it has been found out that communication is often possible even when no frame synchronization signals are detected. If the reproduction was interrupted while no frame synchronizing signals are detected, an objectionable or unpleasing interruption of the communication often takes place despite the fact that the communication can be continued. Once the receiver is put into the asynchronous state, noise alone is reproduced during the objectionable interruption of the communication because the descrambling is carried out in a manner which is different from the scrambling of the transmitter.

SUMMARY OF THE INVENTION

It is an object of this invention to provide a receiver which is capable of quickly establishing stable frame synchronization.

It is another object of this invention to provide a receiver of the type described, wherein the frame synchronization is kept even when no frame synchronization signals are detected during a certain interval of time.

It is a further object of this invention to provide a receiver of the type described, wherein it is possible to avoid an objectionable interruption of communication.

A receiver to which this invention is applicable is responsive to an input signal comprising information signals following frame synchronization signals, respectively. The receiver produces a reproduction of the information signals with frame synchronization established. The receiver includes signal producing means responsive to the input signal for producing a succession of digital signals conveying the respective information signals and signal converting means for converting the digital signals into the reproduction. According to this invention, the receiver comprises monitoring means for monitoring a predetermined one of the succession and the reproduction to produce a result signal indicative of whether or not the digital signals are produced in response to the input signal, and frame synchronization establishing means responsive to the input signal and the result signal for establishing the frame synchronization with reference to both of the input signal and the result signal.

DESCRIPTION OF THE PREFERRED EMBODIMENTS

Figure 1:
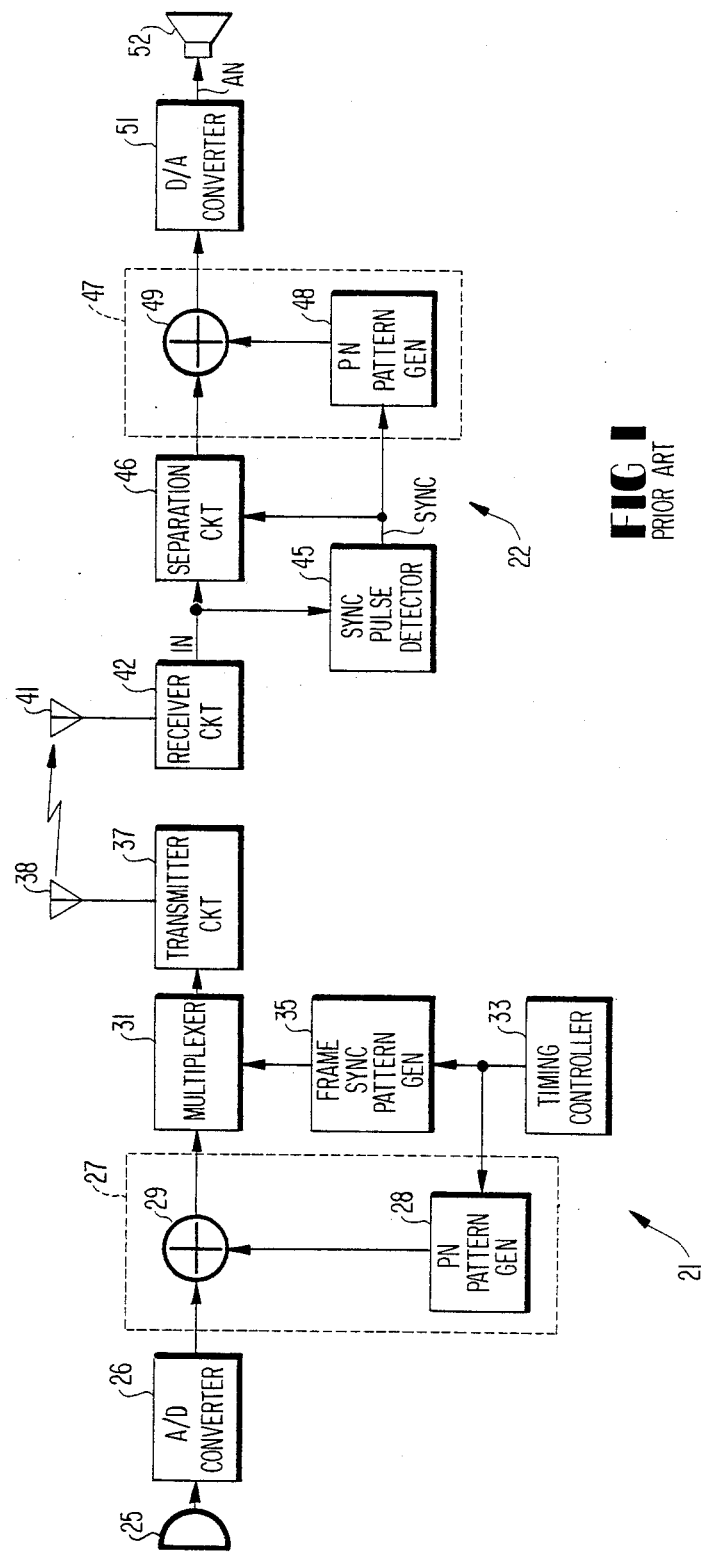
FIG. 1 is a block diagram of a conventional system comprising a transmitter and a receiver for use in combination with the transmitter.

Referring to FIG. 1, description will be made about a conventional signal transmission system for a better understanding of this invention. The conventional system comprises a transmitter 21 which can be used also in a signal transmission system comprising a receiver according to this invention. A receiver 22 of the signal transmission system is communicable with the transmitter 21 through a radio transmission path.

The illustrated transmitter 21 comprises a transmitter microphone 25 for producing an analog audio signal in response to a voice signal and an analog to digital (A/D) converter 26 for converting the analog audio signal into a digital audio signal. The analog to digital converter 26 may carry out adaptive differential pulse code modulation. The digital audio signal is sent to a scrambler 27 to be subjected to scrambling.

The scrambler 27 comprises a transmitter pseudo noise (PN) pattern generator 28 for generating a succession of transmitter pseudo noise pulses having a random pattern. An adder 29 logically adds the pseudo noise pulses to the digital audio signal to supply scrambled digital signals to a multiplexer 31. The scrambled digital signals will be called information signals because they carry information related to the analog audio signal.

A timing controller 33 generates a sequence of timing pulses at a predetermined period which specifies each frame and which may be called a frame period. The timing pulses will therefore be referred to as frame synchronization pulses and are delivered to the pseudo noise pattern generator 28 and a frame synchronization (SYNC) pattern generaor 35. The pseudo noise pattern generator 28 is put into operation in this manner in synchronism with the timing pulses. As a result, the same random pattern is repeated at every frame.

On the other hand, the frame synchronization pattern generator 35 generates a frame synchronization pattern in synchronism with the timing pulses. The frame synchronization pattern is therefore produced at every frame and sent to the multiplexer 31 as a frame synchronization signal.

The scrambled digital signals are combined with the frame synchronization signals by the multiplexer 31 and delivered as an output signal through a transmitter circuit 37 and a transmitter antenna 38 to a radio channel.

In FIG. 1, the receiver 22 receives the output signal as a reception signal IN through a receiver antenna 41 and a receiver circuit 42. The reception signal IN will be referred to as an input signal and comprises the scrambled digital signals following the frame synchronization signals like the output signal. The scrambled digital signals carries information transmitted from the transmitter 21 and may be referred to as information signals. The input signal IN is delivered to a synchronization pulse detector 45 for detecting the frame synchronization signals to produce reproduced frame synchronization pulses SYNC which appear at the same frame period as the timing pulses of the timing controller 33.

In order to establish frame synchronization in the receiver, the synchronization signal detector 45 determines either a synchronous state or an asynchronous one by monitoring the frame synchronization signals over a plurality of the frames in the manner known in the art.

The input signal IN is supplied to a separation circuit 46 together with the reproduced frame synchronization pulses SYNC. The separation circuit 46 extracts a reproduced sequence of the scrambled digital signals from the input signal IN with reference to the reproduced frame synchronization pulses SYNC. The reproduced sequence of the scrambled digital signals is supplied to a descrambler 47 along with the reproduced frame synchronization pulses SYNC.

The descrambler 47 comprises a receiver pseudo noise pattern generator 48 and an adder circuit 49. The receiver pseudo noise pattern generator 48 is similar in structure and operation to the pseudo noise pattern generator 28 of the transmitter 21. Therefore, the receiver pseudo noise pattern generator 48 produces a receiver pseudo noise sequence which is similar to the transmitter pseudo noise sequence and is in synchronism with the reproduced frame synchronization pulses SYNC. The receiver pseudo noise sequence has the same pattern as the transmitter pseudo noise sequence as long as the frame synchronization is established in the receiver 22.

The adder circuit 49 adds the receiver pseudo noise sequence to the reproduced sequence of the scrambled digital signals to produce a sequence of descrambled digital signals. The descrambled digital signal sequence is identical with the digital audio signal produced by the analog to digital converter 26 while no error occurs in the descrambled digital signal sequence with the frame synchronization established in the receiver 22. At any rate, the descrambled digital signal sequence conveys the information signals. A combination of the separation circuit 46 and the descrambler 47 therefore serves to produce the descrambled digital signal sequence and may be named a digital signal production circuit.

The descrambled digital signal sequence is given to a digital to analog (D/A) converter 51 and converted into a reproduced analog signal AN which is a reproduction of the audio analog signal. The reproduced analog signal is supplied to a loudspeaker 52 to be audibly reproduced.

In the above-mentioned receiver 22, the frame synchronization is established by the use of only the frame synchronization signals included in the input signal IN. The receiver 22 therefore has disadvantages as pointed out in the preamble of the instant specification. In addition, the adder circuit 49 carries out addition different from that carried out in the adder 29 of the transmitter 21, once the receiver is out of frame synchronization. As a result, any noises are adibly reproduced by the loudspeaker 52.

Figure 2:
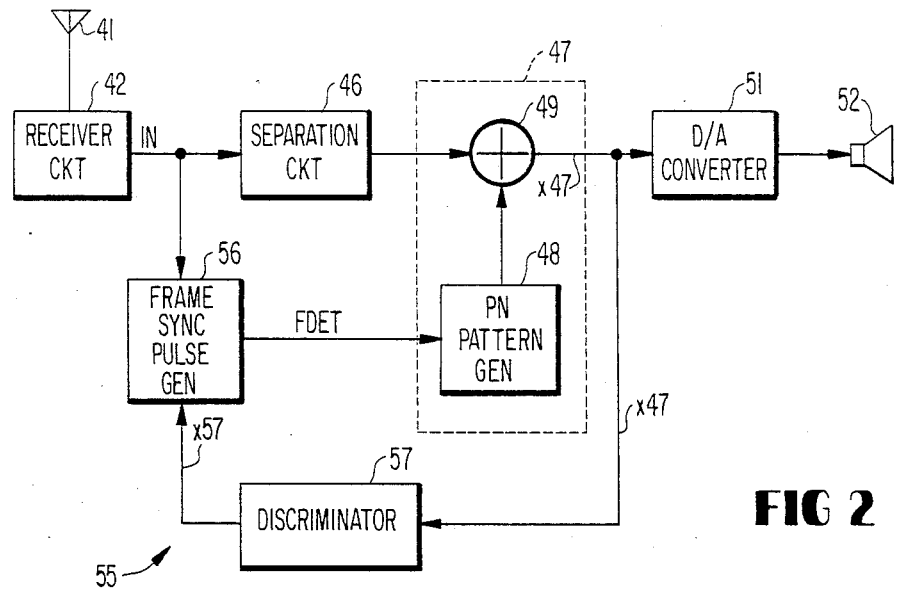
FIG. 2 is a block diagram of a receiver according to a first embodiment of this invention, which is for use in combination with the transmitter illustrated in FIG. 1.

Referring to FIG. 2, a receiver 55 according to a first embodiment of this invention is for use in combination with the transmitter 21 illustrated in FIG. 1 and comprises similar parts designated by like reference numerals. The illustrated receiver 55 comprises a synchronization pulse generator which is somewhat different from the synchronization pulse generator 45 as will later be described more in detail and which is therefore designated by 56. The synchronization pulse generator 56 is coupled to a discriminator, namely, speech detector 57 which is responsive to the descrambled digital signal sequence depicted at x47. For convenience of description, each output signal of circuits will be represented by a combination of x and the reference numeral attached to each circuit, like x47.

It suffices to say that the discriminator 57 monitors the descrambled digital signal sequence x47 to detect whether or not the descrambled digital signal sequence x47 is produced by the descrambler 47. In other words, the discriminator 57 serves to discriminate the descrambled digital signal sequence x47 from any other spurious signals.

It has been found out that the frame synchronization may be regarded as being established during presence of the descrambled digital signal sequence x47 even when the frame synchronization signals are not detected by the frame synchronization pulse detector 56. Stated otherwise, the receiver 22 becomes out of frame synchronization only when absence of the descrambled digital signal sequence x47 lasts for a long time.

It is possible to discriminate between the descrambled digital signal sequence x47 and other undesired or non-speech signals in various manners as will be exemplified later.

In any event, the discriminator 57 produces a result signal x57 indicative of whether or not the digital signals are produced in response to the input signal IN. It is assumed that the result signal x57 takes a logic "1" level and a logic "0" level when the digital signals are produced and not, respectively.

Figure 3:
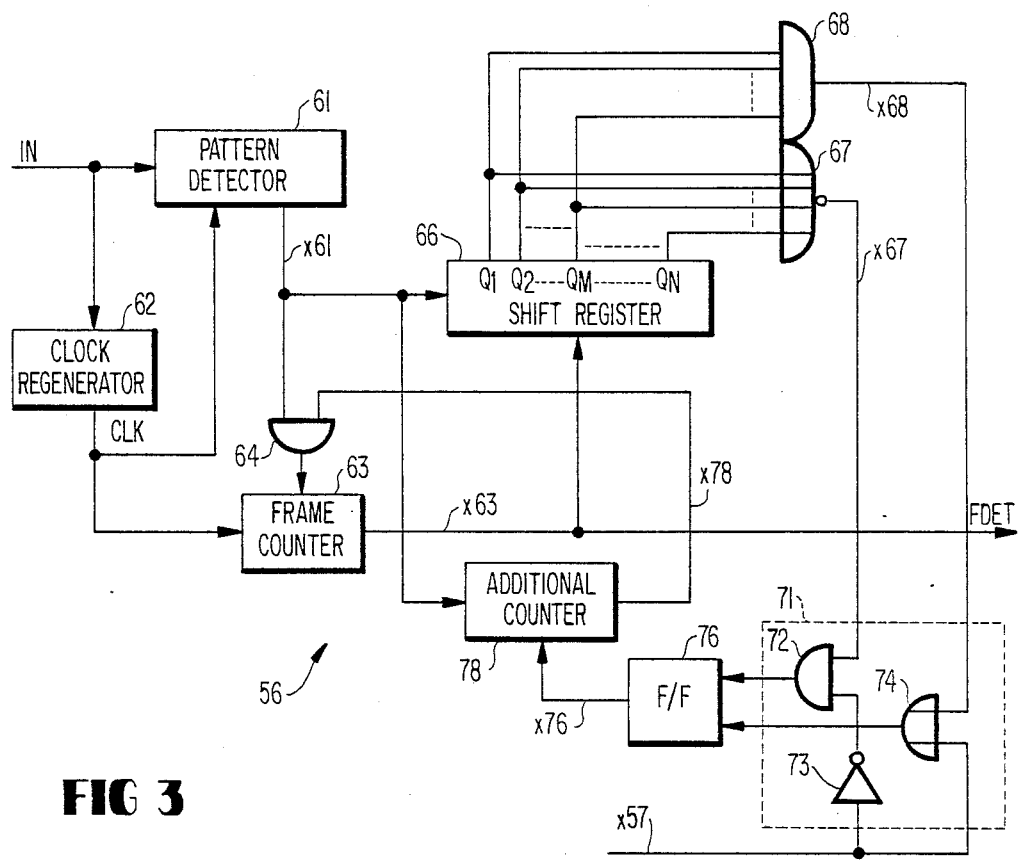
FIG. 3 is a block diagram of a frame synchronization pulse generator for use in the receiver illustrated in FIG. 2.
Figure 4:
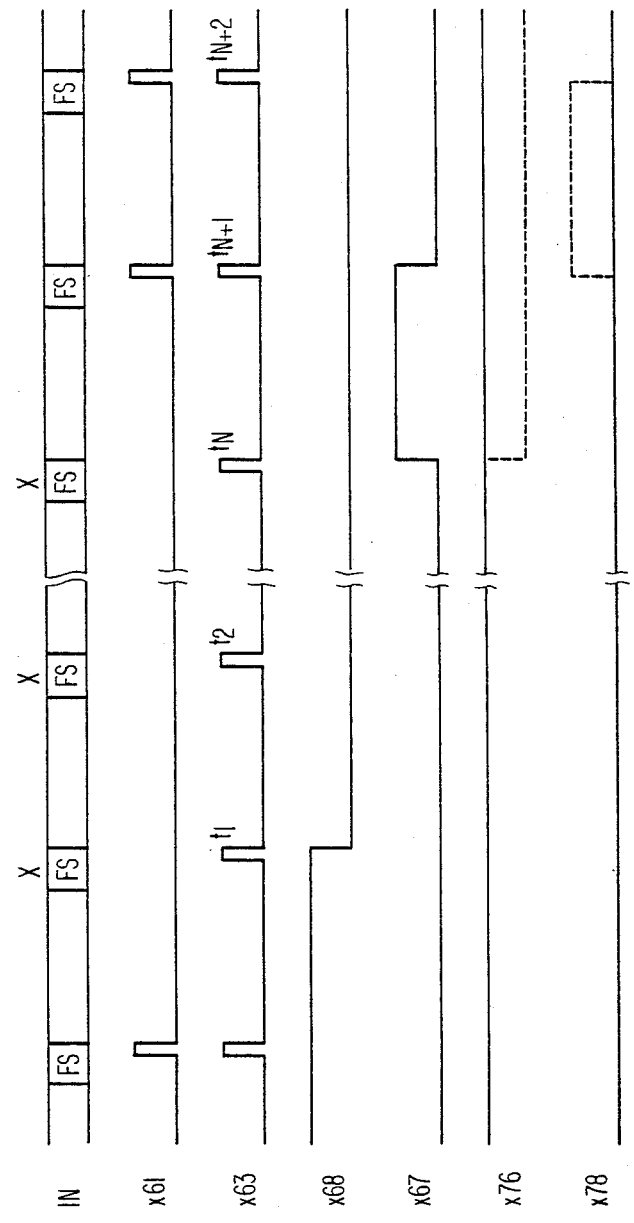
FIG. 4 is a time chart for use in describing operation of the frame synchronization pulse generator illustrated in FIG. 3.

Referring to FIGS. 3 and 4 together with FIG. 2, the frame synchronization pulse generator 56 is for establishing the frame synchronization with reference to both of the input signal IN and the result signal x57. More particularly, the input signal IN is delivered to both of a pattern detector 61 and a clock regenerator 62. The clock regenerator 62 regenerates a succession of clock pulses CLK in response to the input signal IN in the known manner. The clock pulse succession CLK is synchronized with each bit of the input signal IN and sent to the pattern detector 61 and a frame counter 63.

Supplied with the input signal IN and the clock pulse succession CLK, the pattern detector 61 produces a detection pulse x61 each time when the frame synchronization pattern (depicted at FS in FIG. 4) is detected from the input signal IN by the pattern detector 61. In FIG. 4, it is assumed that the frame synchronization patterns FS are not detected at crisscross positions of FIG. 4 and the detection pulses x61 are produced at the remaining positions. Each of the detection pulses x61 is sent to the frame counter 63 through an AND gate 64 operable in the manner which will presently be described.

Responsive to the clock pulse succession CLK, the frame counter 63 produces a succession of frame synchronization pulses x63 when the frame synchronization is established. In FIG. 4, the frame synchronization pulses x63 appear as illustrated at $t_1$ and $t_2$ even when the frame synchronization patterns FS are not detected by the pattern detector 61. The frame synchronization pulses x63 are supplied as frame detection pulses FDET to the pseudo noise pattern generator 48 (FIG. 2).

The detection pulses x61 are also sent from the pattern detector 61 to a shift register 66 of N-stages operable in synchronism with the frame synchronization pulses x63, where N is an integer greater than two. The shift register 66 produces first through N-th output signals $Q_I$ to $Q_N$ from the respective stages. The first through N-th output signals $Q_I$ to $Q_N$ are delivered to a NOR gate 67 while the first through M-th output signals $Q_I$ to $Q_M$ are delivered to an AND gate 68, where M is another integer smaller than N.

The NOR gate 67 produces a logic "1" level signal as a first gate signal x67 when the first through N-th output signals $Q_I$ to $Q_N$ take the logic "0" level. This means that the detection pulses x61 are not detected during N consecutive frames.

On the other hand, the AND gate 68 produces the logic "1" level signal as a second gate signal x68 when the first through M-th output signals $Q_I$ to $Q_M$ take the logic "1" level. This implies that the detection pulses x61 are detected by the pattern detector 61 during M consecutive frames.

The conventional synchronization pulse detector 45 (illustrated in FIG. 1) judges that the receiver 22 is put into an asynchronous and a synchronous state when the first and the second gate signals x67 and x68 take the logic "1" levels, respectively.

In the example being illustrated, the asynchronous and the synchronous states are determined with reference to the result signal x57 supplied from the discriminator 57 in the manner which will presently be described. To this end, the illustrated frame synchronization pulse detector 56 further comprises a gate circuit 71 supplied with the first and the second gate signals x67 and x68 and with the result signal x57.

The gate circuit 71 comprises an AND gate 72, an inverter 73, and an OR gate 74. The AND gate 72 is supplied with the first gate signal x67 and with the result signal x57 through the inverter 73 while the OR gate 74 is directly supplied with both of the second gate signal x68 and the result signal x57. As mentioned before, the result signal x57 takes the logic "1" level on detection of the descrambled digital signal x47. Accordingly, the AND gate 72 produces the logic "1" level as a first circuit output signal when the result signal x57 and the first gate signal x67 take the logic "0" and the logic "1" levels, respectively. The OR gate 74 produces the logic "1" level as a second circuit output signal when either the result signal x57 or the second gate signal x68 takes the logic "1" level.

A flip-flop 76 has reset and set terminals R and S connected to the AND gate 72 and the OR gate 74, respectively. As a result, the flip-flop 76 produces a flip-flop output signal x76 of the logic "1" level when the second circuit output signal takes the logic "1" level. The flip-flop output signal x76 takes the logic "0" level when the logic "1" level is given as the first circuit output signal from the AND gate 72 to the flip-flop 76.

With the frame synchronization pulse detector 56, the flip-flop output signal x76 is switched into the logic "1" and the logic "0" levels in a synchronous and an asynchronous state, respectively, in the manner which will become clear as the description proceeds.

An additional counter 78 is connected to the AND gate 64 and put into a preset state in response to the flip-flop output signal x76 of the logic "1" level to produce a counter output signal x78 of the logic "0" level. Accordingly, the AND gate 64 is closed or disabled as long as the flip-flop output signal x76 takes the logic "1" level in the synchronous state.

On the other hand, the additional counter 78 is changed from the preset state to an active state in response to the flip-flop output signal x76 of the logic "0" level. In the active state, the additional counter 78 counts a first one of the detection pulses x61 that is supplied from the pattern detector 61 to the additional counter 78 in the active state. As a result, the additional counter 78 produces the counter output signal x78 of the logic "1" level until the following detection pulse x61 is supplied from the pattern detector 61. Under the circumstances, the AND gate 64 supplies the frame counter 63 with the logic "1" level to forcibly reset the frame counter 63. Subsequently, the frame counter 63 starts counting the clock pulse succession CLK again. Thus, the AND gate 64 serves to indicate a phase of the frame in cooperation with the additional counter 78 and the pattern detector 61.

After reception of the following detection pulse x61, the counter output signal x78 is kept at the logic "0" level before the detection pulses x61 are counted to K, where K is an additional integer which is not smaller than M. Thus, the counter output signal x78 appears after a time interval during which the detection pulses x61 are counted to (K+1), provided that the flip-flop output signal x76 is not turned into the logic "1" level during the time interval. From this fact, it is understood that the AND gate 64 serves to check whether or not the detection pulses, M in number, are detected during the time interval.

In FIG. 3, the shift register 66 successively stores the detection pulses x61 in synchronism with the frame synchronization pulses x63. Stated otherwise, the logic "1" level is stored in each stage of the shift register 66 when coincidence is detected between the detection pulses x61 and the frame synchronization pulses x63.

When the coincidence occurs M times in the course of closure of the AND gate 64, the second gate signal x68 is turned to the logic "1" level as mentioned before. The resultant flip-flop 76 is set to produce the flip-flop output signal x76 of the logic "1" level and to switch the counter output signal x78 into the logic "0" level. Thus, the frame synchronization is established in the receiver 22.

Let the result signal x57 take the logic "1" level before occurrence of the coincidence between the frame synchronization pulses x63 and the detection pulses x61 is detected M times. In this event, the frame synchronization is established in response to the result signal x57 of the logic "1" level because the flip-flop 76 is set to switch the counter output signal x78 into the logic "0" level and to close or disable the AND gate 64.

In FIG. 4, the detection pulses x61 are not detected N times. However, the frame synchronization pulses x63 are produced N times, as suggested at $t_1$ to $t_N$. When the detection pulses x61 are not detected N times, the first gate signal x67 becomes the logic "1" level until reception of the following one of the detection pulses x61.

If the result signal x57 takes the logic "0" level on production of an N-th one of the frame synchronization pulses x63, the flip-flop output signal x76 becomes the logic "0" level, as illustrated by a dashed line in FIG. 4, to indicate the asynchronous state. Otherwise, the flip-flop output signal x76 is kept at the logic "1" level, as illustrated by a real line in FIG. 4. Thus, the frame synchronization is stably kept even when the detection pulses x61 are not detected N times.

When the flip-flop output signal x76 becomes the logic "0" level, as indicated by the dashed line, the counter output signal x78 is turned to the logic "1" level during one frame, as illustrated by another dashed line.

Figure 5:
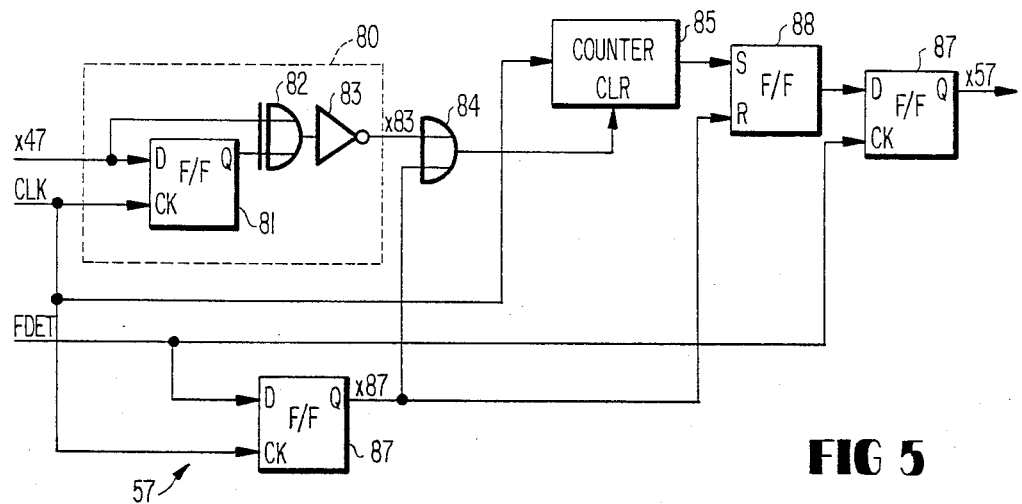
FIG. 5 is a block diagram of a discriminator for use in the receiver illustrated in FIG. 2.

Referring to FIG. 5, the discriminator 57 is applicable to the receiver 55 illustrated in FIG. 2 and is supplied with the descrambled digital signals x47 to produce the result signal sequence x57 as mentioned before. The illustrated discriminator 57 is also supplied with the frame detection pulses FDET from the frame synchronozation pulse generator 56.

The descrambled digital signals x47 carry the audio signals as the information as described before. Let the audio signals be speech signals which are usually accompanied by pauses. In this event, the descrambled digital signals x47 comprise information parts and silent parts. Each silent part is interposed between two adjacent ones of the information parts. Such silent parts result from the respective pauses.

As regards the adaptive differential pulse code modulation, a preselected or specific pattern of "10" frequently appears in the silent parts of the descrambled digital signal succession x47 during the synchronous state of the receiver 55. However, the preselected pattern does not appear in the descrambled digital signal succession x47 in the asynchronous state. In other words, the preselected pattern disappears on reception of the undesired signals.

In FIG. 5, the illustrated discriminator 57 comprises a specific pattern detector 80 responsive to a clock pulse succession CLK and the descrambled digital signal succession x47 for detecting an iteration of the preselected pattern of "10." The clock pulse succession CLK is similar to that described in conjunction with FIG. 3. More specifically, the specific pattern detector 80 comprises a first delay flip-flop 81 for delaying each bit of the descrambled digital signal succession x47 by a single bit in the well-known manner to produce a delayed succession, an Exclusive OR gate 82 for carrying out Exclusive OR operation between the delayed succession and the descrambled digital signal succession x47, and an inverter 83 for inverting an output signal of the Exclusive OR gate 82 to produce a pattern detection signal x83.

When the preselected pattern of "10" repeatedly appears in the descrambled digital signal succession x47, the pattern detection signal x83 is continuously kept at the logic "0" level as will readily be understood from FIG. 5. Otherwise, the pattern detection signal x83 varies at random with time.

The pattern detection signal x83 is sent through an OR gate 84 to a counter 85 and serves as a clear signal CLR when the pattern detection signal x83 takes the logic "1" level. The counter 85 counts the clock pulse succession CLK to a predefined count determined in relation to a duration of each silent part.

Responsive to the frame detection pulses FDET, a second delay flip-flop 87 produces delayed detection pulses x87 which are delayed by one bit relative to the frame detection pulses FDET. The delayed detection pulses x87 are delivered directly to a reset input R of an R-S flip-flop 88 and through the OR gate 84 to the counter 85. As a result, both of the counter 85 and the R-S flip-flop 88 are put into initial states at a leading edge of each delayed detection pulse x87.

When one of the frame detection pulses FDET is supplied to the discriminator 57, the counter 85 and the R-S flip-flop 88 are put in the initial states in response to the delayed detection pulse x87 which results from the one frame detection pulse FDET in synchronism with one of the clock pulses CLK. The delayed detection pulse x87 disappears in response to the following one of the clock pulses CLK. Under the circumstances, let the preselected pattern of "10" repeatedly occur in the descrambled digital signal succession x47. In this event, the counter 85 counts the clock pulses CLK. When the clock pulses CLK are counted to the predefined count, the R-S flip-flop 88 is put into a set state. The set state is extracted from the R-S flip-flop 88 by the use of a third delay flip-flop 89 in synchronism with the clock pulses CLK. As a result, the third delay flip-flop 89 produces the logic "1" level as the result signal x57 representative of presence of the descrambled digital signal succession x47.

After reception of a following one of the frame detection pules FDET, the delayed detection pulse x87 is sent to the counter 85 and the R-S flip-flop 88. As a result, the counter 85 and the R-S flip-flop 88 are turned back to the initial states.

On the other hand, when frame synchronization is not established, no descrambled digital signal succession x47 is supplied to the specific pattern detector 80. In other words, the specific pattern detector 80 is given other undesired signals of random patterns. Accordingly, the pattern detection signal x83 successively and irregularly varies from one logic level to another with time. The counter 85 is therefore reset before the clock pulses CLK are counted to the predefined count. The R-S flip-flop 88 and the third delay flip-flop 89 are kept in reset states, respectively. Hence, the third delay flip-flop 89 produces the result signal x57 of the logic "0" level.

Figure 6:
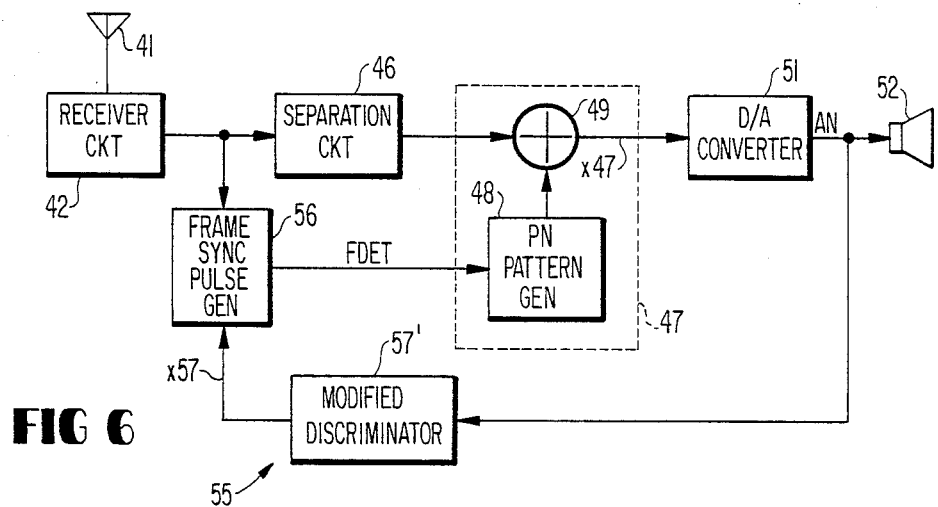
FIG. 6 is a block diagram of a receiver according to a second embodiment of this invention.

Referring to FIG. 6, a receiver 55 according to a second embodiment of this invention is similar to that illustrated in FIG. 2 except that a modified discriminator 57' monitors the reproduced analog signal AN to produce the result signal x57 indicative of whether or not the descrambled digital signals x47 are produced as desired or information signals from the descrambler 47. In other words, the modified discriminator 57' is for discriminating between the reproduced analog signals AN resulting from the desired signals and other undesired analog signals. The reproduced digital signals and the undesired signals are produced in the synchronous and the asynchronous states, respectively.

As mentioned in conjunction with FIG. 5, the descrambled digital signals x57 comprise the information parts and the silent parts when the speech signals are received in the receiver 55. The information parts and the silent parts have variable information amplitudes and variable silent amplitudes, respectively. In addition, the undesired signals have undesired amplitudes specified by irregular waves.

It is to be noted here that the silent amplitudes are considerably lower than the information and the undesired amplitudes. Therefore, the silent parts can be discriminated from the information parts and the undesired signals.

Figure 7:
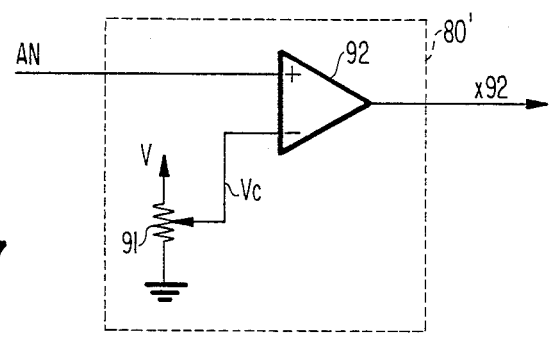
FIG. 7 is a block diagram of a discriminator for use in the receiver illustrated in FIG. 6.

Referring to FIG. 7 together with FIG. 6, the modified discriminator 57' comprises a modified pattern detector 80' which is substituted for the specific pattern detector 80 illustrated in FIG. 5. The modified pattern detector 80' comprises a threshold circuit 91 for producing a threshold signal representative of a threshold amplitude or voltage Vc. The threshold circuit 91 may be a voltage divider in the manner exemplified in FIG. 7. The threshold voltage Vc is intermediate between the undesired and the silent amplitudes.

A comparator 92 compares either one of the reproduced analog signal AN and the undesired analog signals with the threshold signal to produce an amplitude detection signal x92. The amplitude detection signal x92 becomes the logic "0" level only when either one of the reproduced and the undesired analog signals is lower in amplitude than the threshold voltage Vc. The logic "0" level of the amplitude detection signal x92 specifies each silent part of the descrambled digital signals x47.

The amplitude detection signal x92 is sent to the counter 85 (FIG. 5) through the OR gate 84 instead of the pattern detection signal x83 and is processed in the manner described with reference to FIG. 5. Anyway, the result signal x57 becomes the logic "1" level during each of the silent parts in the synchronous state and takes the logic "0" level in the asynchronous state, like in FIG. 5.

Thus, discrimination between the reproduced analog signals AN and the undesired analog signals is made in the receivers according to the first and the second embodiments by the use of the silent parts included in the desired or audio signals. However, the discrimination may be difficult on reproducing the audio signals, such as music signals, in which the information parts lasts for a long time without the silent parts.

Figure 8:
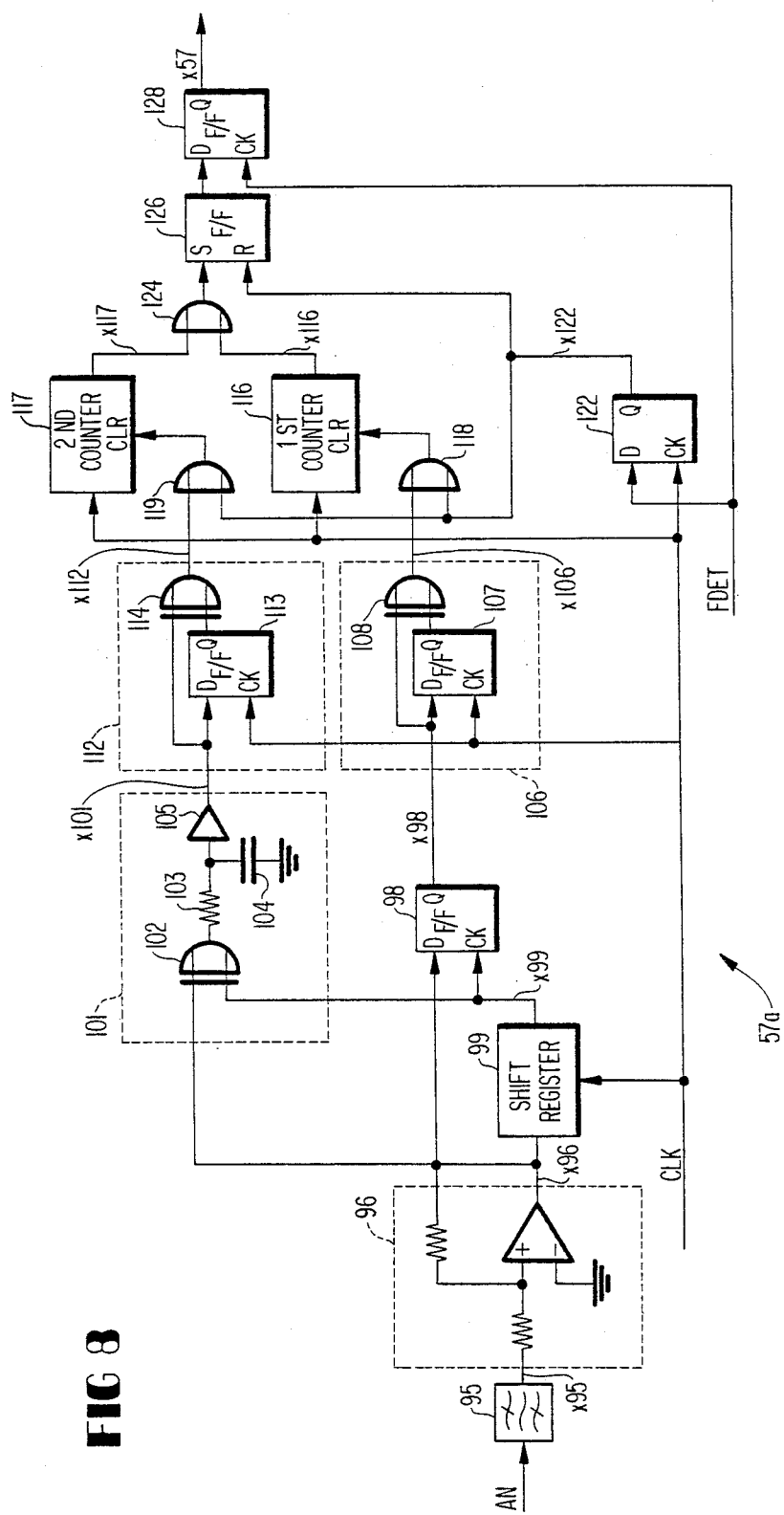
FIG. 8 is a block diagram of a discriminator for use in a receiver according to a third embodiment of this invention.

Referring to FIG. 8, a discriminator 57a is for use in a receiver according to a third embodiment of this invention and can be substituted for the modified discriminator 57' illustrated in conjunction with FIGS. 6 and 7. The illustrated discriminator 57a responds to the reproduced analog signal AN supplied from the digital to analog converter 51 (FIG. 6) and can discriminate between the desired signals (the reproduced analog signals) and other undesired signals even on reception of the music signals.

It should be noted here that the audio signals have a strong autocorrelation along a time axis. This means that the audio signals, namely, the reproduced analog signals have amplitudes periodically variable with time. It is therefore possible to discriminate the reproduced analog signals AN from the undesired analog signals by detecting the autocorrelation which the reproduced analog signals have. To this end, a signal period is determined in consideration of periodical variation of the reproduced analog signal amplitudes.

More specifically, the illustrated discriminator 57a comprises a band-pass filter 95 having a bandwidth of about 1 kHz. The reproduced analog signals AN are restricted by the band-pass filter AN to a predetermined frequency band for a prescribed peak component of the reproduced analog signal AN and are sent as band-restricted analog signals x95 to a comparator 96 and to a first delay circuit 98 which may be a delay flip-flop operable in response to clock pulses CLK which are similar to those illustrated in FIG. 5.

The illustrated comparator 96 has a hysteresis characteristic and set and reset voltages different from each other. As shown in FIG. 8, the comparator 96 comprises a comparator element and a pair of resistors one of which is placed in a feedback loop of the comparator. As a result, the band-restricted analog signals x95 are converted by the comparator 96 into a succession of rectangular pulses x96. The rectangular pulses x96 are successively supplied to a shift register 99 having a delay $\tau$ related to the signal period. The shift register 99 delays the rectangular pulses x96 in accordance with the clock pulses CLK to deliver delayed rectangular pulses x99 to the first delay circuit 98 and an autocorrelation circuit 101.

The first delay circuit 98 is operable to detect an autocorrelation between the rectangular signals x96 and the delayed rectangular pulses x99 to produce a first autocorrelation signal x98 representative of a first result of the autocorrelation. The first autocorrelation signal x98 is usually kept at a preselected one of the logic levels on reception of the audio signals having the strong autocorrelation, as will later be described.

Likewise, the autocorrelation circuit 101 is also operable to detect a similar autocorrelation between the rectangular pulses x96 and the delayed rectangular pulses x99 to produce a second autocorrelation signal x101 representative of a second result of another autocorrelation. The second autocorrelation signal x101 indicates a phase shift between the rectangular and the delayed rectangular pulses x96 and x99 relative to the signal period, as will become clear as the description proceeds. The autocorrelation circuit 101 comprises an Exclusive OR gate 102 for the rectangular and the delayed rectangular pulses x96 and x99, a resistor 103, a capacitor 104, and an amplifier 105.

A combination of the band-pass filter 95, the comparator 96, the shift register 99, the first delay circuit 98, and the autocorrelation circuit 101 may be referred to as an autocorrelation detecting circuit. The first and the second autocorrelation signals x98 and x101 will collectively be called an autocorrelation specifying signal for specifying autocorrelation of the reproduced analog signal AN. The first delay circuit 98 and the autocorrelation circuit 101 may be named an autocorrelation processing circuit.

The first autocorrelation signal x98 is supplied to a first variation detector 106 comprising a first delay flip-flop 107 and a first Exclusive OR gate 108. The first variation detector 106 is similar in operation to the specific pattern detector 80 illustrated in FIG. 5 and produces the logic "1" level as a first variation pulse x106 when two adjacent bits of the first autocorrelation signal x98 take different logic levels. Likewise, a second variation detector 112 comprises a second delay flip-flop 113 and a second Exclusive OR gate 114 and produces a second variation pulse x112 of the logic "1" level on detection of a variation between two adjacent bits of the second autocorrelation signal x101.

Like in the counter 85 illustrated in FIG. 5, the first and the second variation pulses x106 and x112 are supplied as clear signals CLR to first and second counters 116 and 117 through first and second OR gates 118 and 119, respectively. A second delay circuit 122 delays the frame detection pulses FDET to supply delayed detection pulses x122 as the clear signals CLR to the first and the second counters 116 and 117 like the second delay flip-flop 87 illustrated in FIG. 5. Anyway, the first and the second counters 116 and 117 count the clock pulses CLK to preselected counts to produce first and second counter output signals x116 and x117 of the logic "1" levels, respectively, unless the clear signals CLR are supplied to the first and the second counters 116 and 117.

The first and the second counter output signals x116 and x117 are sent through an OR gate 124 and an R-S flip-flop 126 to a third delay circuit 128 to be derived from the third delay circuit 128 as the result signal x57 in the manner illustrated with reference to FIG. 5.

Figure 9:
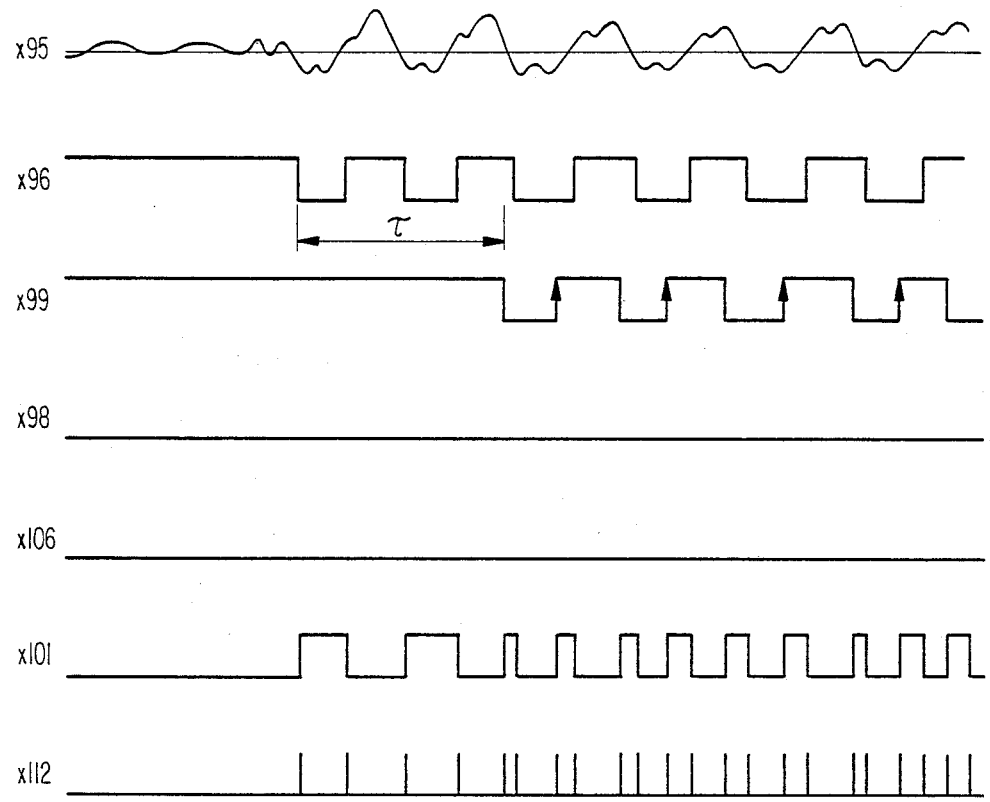
FIG. 9 is a time chart for use in describing operation of the discriminator illustrated in FIG. 8.

Referring to FIG. 9 together with FIG. 8, operation will be described on the assumption that the reproduced analog signals AN are sent to the comparator 96 through the band-pass filter 95 as the band-restricted analog signal x95, as illustrated along the top line of FIG. 9. The band-restricted analog signals x95 are converted into the rectangular pulses x96 by the comparator 96 due to the hysteresis characteristic of the comparator 96, as illustrated along the second line of FIG. 9. This is because the band-restricted analog signals x95 periodically vary with the signal period.

The rectangular pulses x96 are delayed by the delay $\tau$ in the shift register 99 to be produced as the delayed rectangular pulses x99, as shown along the third line of FIG. 9. In FIG. 9, it is assumed that the rectangular pulses x96 have phases different from the delayed rectangular pulses x99 and that the first delay circuit 98 extracts the band-restricted signals x95 at each leading edge of the delayed rectangular pulses x99, as suggested at arrows in x99 of FIG. 9.

Under the circumstances, the first autocorrelation signal x98 is kept constant as illustrated along the fourth line of FIG. 9. As a result, the first variation pulse x106 is not produced as shown along the fifth line. The resultant first counter 116 therefore counts the clock pulses CLK to the preselected count to produce the first counter output signal x116 of the logic "1" level and to set the R-S flip-flop 126.

On the other hand, the rectangular pulses x96 and the delayed rectangular pulses x99 are sent to the Exclusive OR gate 102 of the autocorrelation circuit 101. Inasmuch as the phases of the rectangular pulses x96 are different from those of the delayed rectangular pulses x99, the autocorrelation circuit 101 produces the second autocorrelation signal x101 corresponding to phase differences between the rectangular and the delayed rectangular pulses x96 and x99, as illustrated along the sixth line of FIG. 9. Supplied with the second autocorrelation signals x101, the second variation detector 112 sends the second variaion pulses x112 as shown along the bottom line to the second counter 117. Accordingly, the second counter 117 is reset by the second variation pulses x112 before the clock pulses CLK are counted to the preselected count. The second counter output signal x117 is kept at the logic "0" level.

However, the R-S flip-flop 126 is put into a set state by the first counter output signal x116 of the logic "1" level. The set state of the R-S flip-flop 126 is extracted through the third delay flip-flop 128 as the result signal x57 of the logic "1" level. Thus, reception of the audio signals is determined even when no silent parts are included in the reproduced analog signals AN.

Figure 10:
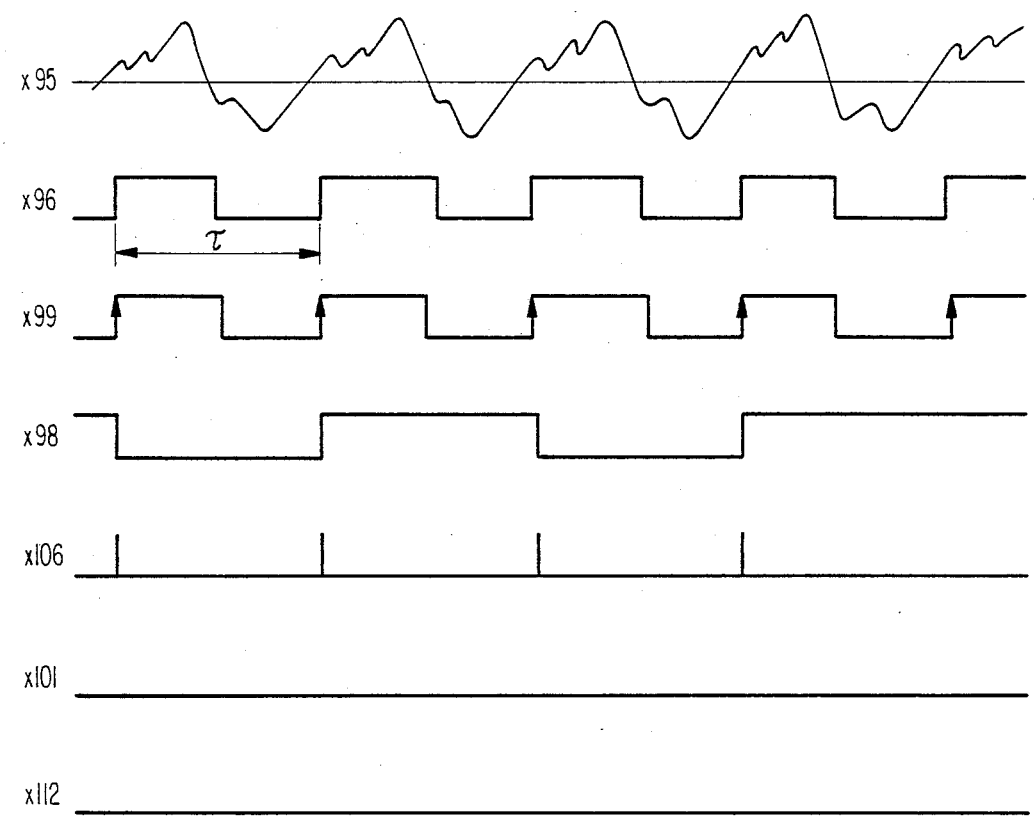
FIG. 10 is a similar time chart for use in describing another operation of the discriminator illustrated in FIG. 8.

Referring to FIG. 10 afresh and FIG. 8 again, operation of the discriminator 57a illustrated in FIG. 8 will be described on the assumption that the rectangular pulses x96 are coincident in phase with the delayed rectangular pulses x99 by chance, as illustrated along the second and the third lines of FIG. 10, when the delay of the shift register 99 is equal to $\tau$. In this event, the first delay circuit 98 retimes the rectangular pulses x96 at each leading edge of the delayed rectangular pulses x99 to produce the first autocorrelation signal x98 which is specified by pulses having widths irregularly variable, as illustrated along the fourth line of FIG. 10. Thus, the first autocorrelation signal x98 appears on a phase coincidence between the rectangular and the delayed rectangular pulses x96 and x99. The first autocorrelation signal x98, namely, the irregular pulses are converted by the first variation detector 106 into a succession of narrow pulses, as illustrated along the fifth line of FIG. 10. The narrow pulses are sent as the first variation pulse x106 to the first counter 116 and serve to reset the first counter 116. Therefore, the first counter output signal x116 is kept at the logic "0" level.

On the other hand, the autocorrelation circuit 101 is supplied with the rectangular and the delayed rectangular pulses x96 and x99, as illustrated in FIG. 10, and produces the second autocorrelation signal x101 which is kept at the logic "0" level. Therefore, the second variation signal x112 is also kept at the logic "0" level and allows the second counter 117 to count the clock pulses CLK to the preselected count. When the clock pulses CLK are counted to the preselected count, the second counter output signal x117 are turned into the logic "1" level to set the R-S flip-flop 126. As a result, the result signal x57 of the logic "1" level is extracted from the third delay circuit 128 in the manner mentioned above. Thus, it is possible to detect the audio signals from the reproduced analog signal AN even when the phases of the rectangular and the delayed rectangular pulses coincide with each other. In addition, the result signal x57 takes the logic "1" level when the audio signals have low amplitudes like in the silent parts.

When no reproduced analog signals are included in the reproduced analog signals AN, the amplitudes of the band-restricted analog signals x95 irregularly vary with time. In this event, the first and the second autocorrelation signals x98 and x101 are indicative of occurrence of irregular pulses, respectively, because the autocorrelation becomes weak between the rectangular and the delayed rectangular pulses x96 and x99. As a result, the first and the second counters 116 and 117 are reset by the first and the second variation signals x106 and x112 resulting from the above-mentioned irregular pulses before the clock pulses CLK are counted to the preselected counts, respectively. Therefore, the R-S flip-flop 126 and the third delay circuit 128 are kept at the logic "0" levels, respectively. The result signal x57 takes the logic "0" level to indicate reception of the undesired signals.

With the discriminator 57a illustrated in FIG. 8, discrimination between the reproduced analog signals and the undesired signals is possible even when the silent parts are absent from the audio signals. Accordingly, it is possible for the illustrated discriminator 57a to lengthen a monitoring time for frame synchronization.

For example, it will be assumed that the frame and the frame synchronization signal have frame bits and synchronization bits equal to 250 bits and 8 bits, respectively. In the conventional receiver illustrated in FIG. 1, the monitoring time for frame synchronization is specified by a ratio of the synchronization bits to the frame bits and is equal to 8/250 (=3.2%).

In the receiver illustrated in conjunction with FIGS. 6 and 8, the result signal x57 can be detected from a whole of the frame except the synchronization bits and is detected from aduration equal to 96.8% of the frame. The monitoring time of the illustrated receiver is about 30 times the monitoring time of the conventional receiver.

Anyway, protection of frame synchronization is accomplished in the illustrated receivers by discriminating between the information signals and other undesired signals by the use of the descrambled digital signals. With the receivers, the frame synchronization can quickly be established when the receivers are put in the asynchronous state. Once the frame synchronization is established, the receiver is not readily turned back to the asynchronous state even when the frame synchronization signals are not detected in the frame synchronization pulse detector 56.

While this invention has thus far been described in conjunction with a few embodiments thereof, it will readily be possible for those skilled in the art to put this invention into practice in various other manners. For example, a plurality of the discriminators 57, 57', and 57a illustrated in FIGS. 5, 7, and 8 may be used in a single receiver. The information signals may not be audio signals but video signals or the like. In addition, the receiver may not be a radio receiver.

What is claimed is:

1. A receiver responsive to an input signal comprising a plurality of frames, each frame to include information signals following frame synchronization signals, for producing a reproduction of said information signals with frame synchronization established, said receiver including a signal producing means responsive to said input signal for producing a succession of digital signals conveying the respective information signals and signal converting means for converting said digital signals into said reproduction, wherein the improvement comprises:
monitoring means for monitoring a predetermined one of said succession of digital signals and said reproduction of said information signals to produce a result signal indicative of whether or not said information signals are produced in response to said input signal; and
frame synchronization establishing means responsive to said input signal and said result signal for establishing said frame synchronization, said frame synchronization establishing means including means to monitor said result signal and said frame synchronization signals of said input signal over a plurality of said frames to keep said frame synchronization even in the absence of said frame synchronization signals.

2. A receiver as claimed in claim 1, wherein said predetermined one of said succession and said reproduction is said digital signal succession;
said monitoring means comprising:
detecting means responsive to said digital signal succession for detecting a preselected pattern except said frame synchronization signals from said digital signal succession to produce a pattern detection signal when said preselected pattern is detected, said preselected pattern being different from said frame synchronizing signals; and
signal delivering means coupled to said detecting means for delivering said pattern detection signal to said synchronization controlling means as said result signal.

3. A receiver as claimed in claim 2, said information signals being subjected to scrambling and comprising information parts and silent parts interposed between two adjacent ones of said information parts, said signal producing means comprising extracting means for extracting said information signals from said input signal to produce extracted information signals and descrambling means responsive to said extracted information signals for carrying out descrambling of said extracted information signals corresponding to said scrambling and bringing about production of said preselected pattern during each of said silent parts, wherein said detecting means is for detecting said preselected pattern during each of said silent parts.

4. A receiver as claimed in claim 1, wherein said predetermined one of said succession and said reproduction is said reproduction which comprises information parts of variable information amplitudes and silent parts interposed between two adjacent ones of said information parts and having variable silent amplitudes, said information amplitudes being greater than said silent amplitudes;
said monitoring means comprising:
threshold means for producing a threshold signal representative of a threshold amplitude intermediate between said information amplitudes and said silent amplitudes;
comparing means coupled to said threshold means and said signal converting means for comparing said reproduction with said threshold signal to produce an amplitude detection signal representative of said silent parts only when said reproduction is lower in amplitude than said threshold amplitude; and
signal delivery means coupled to said comparing means for delivering said amplitude detection signal to said synchronization controlling means as said result signal.

5. A receiver as claimed in claim 1, said reproduction being periodically variable with time and having autocorrelation therein, wherein said monitoring means is supplied with said reproduction as said predetermined one of said succession and said reproduction and comprises:
autocorrelation detecting means responsive to said reproduction for detecting said autocorrelation to produce an autocorrelation specifying signal specifying said autocorrelation; and
processing means coupled to said autocorrelation detection means for processing said autocorrelation specifying signal to produce said result signal.

6. A receiver as claimed in claim 5, wherein said autocorrelation detecting means comprises:
converting means for converting said reproduction into a succession of rectangular pulses;
delay means responsive to said rectangular pulse succession and having a predetermined delay related to a periodical variation of said reproduction for producing a succession of delayed rectangular pulses which are given said predetermined delay relative to said rectangular pulses; and autocorrelation processing means coupled to said converting means and said delay means for processing said rectangular and said delayed rectangular pulses to produce said autocorrelation specifying signal.

7. A receiver as claimed in claim 6, wherein said autocorrelation processing means comprises:

first means responsive to said rectangular and said delayed rectangular pulses for producing a first autocorrelation signal related to a phase coincidence between said rectangular and said delayed rectangular pulses;

second means responsive to said rectangular and said delayed rectangular pulses for producing a second autocrrelation signal related to a phase difference between said rectangular and said delayed rectangular pulses; and means for supplying said first and said second autocorrelation signals as said autocorrelation specifying signal to said autocorrelation processing means.

8. A receiver as claimed in claim 1, wherein said frame synchronization establishing means comprises:

frame pulse producing means (61) responsive to said input signal for producing a sequence of frame pulses (x61) each time said frame synchronization signals are detected;

frame detection pulse producing means (62, 63) controllable by a control signal and responsive to said input signal for producing a sequence of frame detection pulses (FDET) synchronized with said frame synchronization signals when said frame synchronization is established;

supervising means (66, 67, 68) coupled to said frame pulse producing means for supervising said frame pulses to selectively detect the presence of consecutive ones of said frame pulses that are equal to a first predetermined number (M) and absence of consecutive ones of said frame pulses that are equal to a second predetermined number (N) to produce presence and absence signals (x68, x67) representative of said presence and said absence, respectively;

state determining means (71,72) responsive to said result signal (x57) and selectively responsive to said presence and said absence signals for determining either one of a synchronous state and an asynchronous state to produce a state signal (x76);

counting means (78) responsive to said state signal and said frame pulses for counting said frame pulses to produce an enable signal (x78) when said frame pulses are counted to a third predetermined number (K) with said asynchronous state specified by said state signal;

gate means (64) coupled to said frame pulse producing means and said counting means for allowing said frame pulses to pass therethrough as a gate output signal when said enable signal is given from said counting means; and means for supplying said gate output signal to said frame detection pulse producing means as said control signal to make said frame detection pulse producing means interrupt the production of said frame detection pulses only in the presence of said gate signal and to thereby make said frame detection pulse producing means produce said frame detection pulses even in the absence of said frame synchronization signals.

9. A receiver as claimed in claim 8, wherein said first predetermined number is smaller than said second predetermined number while said third predetermined number is not smaller than said first predetermined number.

* * * * *

UNITED STATES PATENT AND TRADEMARK OFFICE
CERTIFICATE OF CORRECTION

PATENT NO. : 4,790,013
DATED : December 6, 1988
INVENTOR(S) : KOUZOU KAGE, Tokyo, Japan It is certified that error appears in the above-identified patent and that said Letters Patent is hereby corrected as shown below:

Column 3, line 4, delete "generaor" and insert --generator--.

Column 4, line 19, delete "adibly" and insert --audibly--.

Column 11, line 63, delete "variaion" and insert --variation--.

Signed and Sealed this

Fourth Day of July, 1989

Attest:

DONALD J. QUIGG

Attesting Officer

Commissioner of Patents and Trademarks